E. H. GREEN.
TROLLEY.
APPLICATION FILED SEPT. 13, 1907.
909,584.
Patented Jan. 12, 1909.
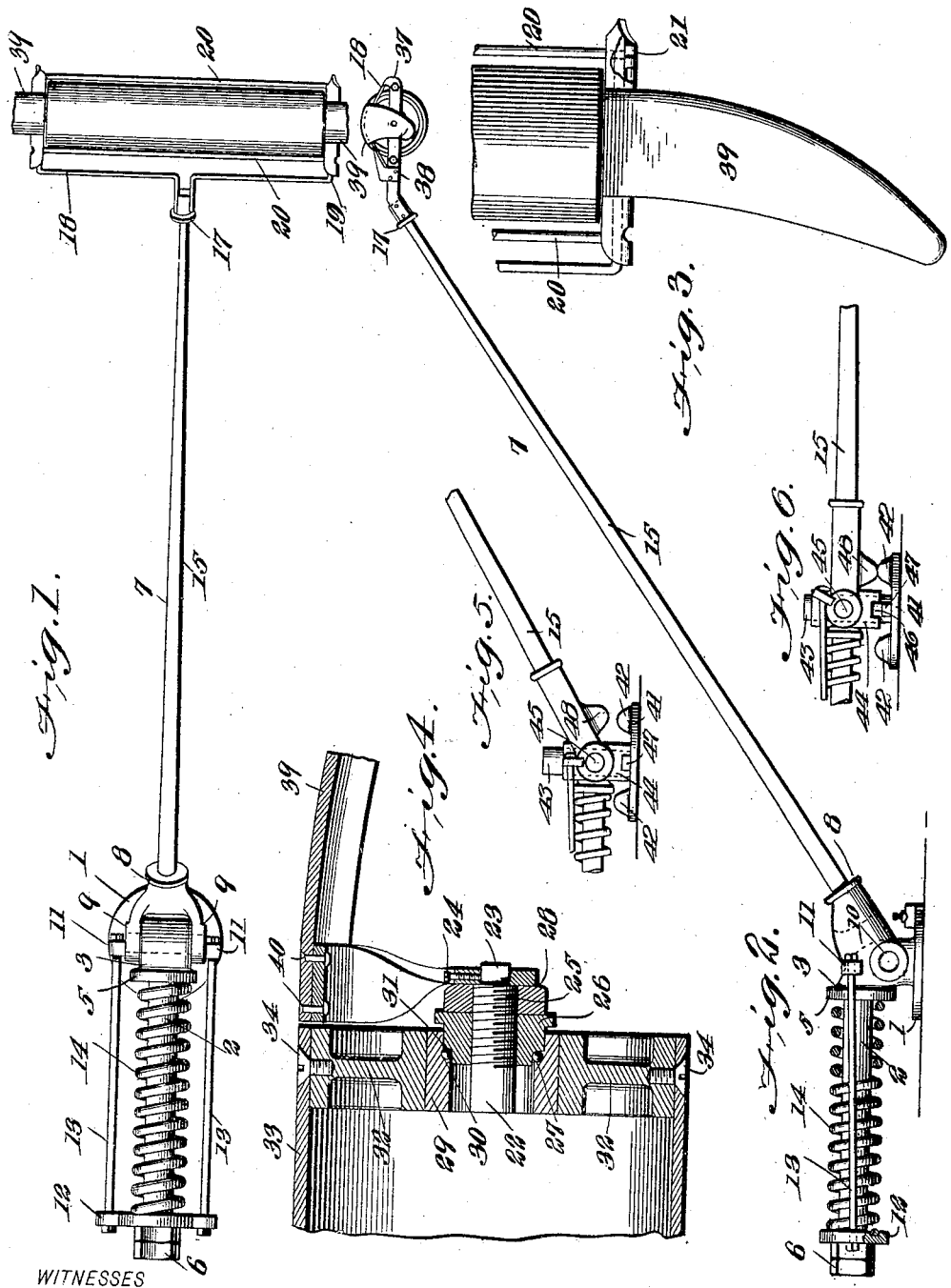
WITNESSES
F. C. Burry
E. M. Callaghan
INVENTOR
EDWIN H. GREEN
BY Munn & Co.
ATTORNEYS.

UNITED STATES PATENT OFFICE.

EDWIN H. GREEN, OF EMERYVILLE, CALIFORNIA.

TROLLEY.

No. 909,584.         Specification of Letters Patent.         Patented Jan. 12, 1909.

Application filed September 13, 1907. Serial No. 392,739.

*To all whom it may concern:*

Be it known that I, EDWIN H. GREEN, a citizen of the United States, and a resident of Emeryville, in the county of Alameda and State of California, have invented certain new and useful Improvements in Trolleys, of which the following is a specification.

My invention is an improvement in trolleys and consists in certain novel constructions and combinations of parts hereinafter described and claimed.

Referring to the drawing forming a part hereof—Figure 1 is a plan view of my improved trolley. Fig. 2 is a side view of the same. Fig. 3 is an enlarged detail plan view of one end of the trolley. Fig. 4 is a partial longitudinal section through the roller. Fig. 5 is a side view of a modified form of base showing the pole in one position, and Fig. 6 is a similar view showing the pole in another position.

The present embodiment of my invention comprises the pole and a base 1, adapted to be secured to the top of the car, the base being provided with a central lug 2, which extends upwardly for a short distance and then extends horizontally and rearwardly as at 3, the said portion being rounded to form a rod, and a collar 5 is arranged between the rounded portion and the remainder of the lug. The free end of the rod is threaded, and is provided with lock nuts 6 thereon. The pole 7 comprises a base portion 8, having ears 9 arranged on each side of the lug 2, the ears and the lug being provided with alined openings, through which passes a pin 10, for the purpose of pivotally securing the pole to the lug. The base portion of the pole 8 is provided on each side with lugs 11, and a sliding collar 12 is arranged on the rod 4, the said collar being connected by rods 13 with the lugs 11 before described, and a spring 14 is arranged between the sliding collar 12 and the collar 5 before mentioned.

The pole proper 15 is connected with the base portion 8, and has connected with the free end thereof the body portion of a yoke 17, the arms 18 of the yoke extend alongside of the pole and parallel with each other for a short distance, thence diverging in opposite directions from each other, the extreme ends of the arms being bent and arranged parallel with each other as at 19. The parallel portions 19 of the arms are connected together by rods 20, which are threaded at each end and traverse openings in the portion 19 of the arms, nuts 21 being arranged on each side of each of the arms, whereby the arms may be adjusted toward and from each other to a limited extent, and retained firmly in their adjusted position.

A shaft 22 having its ends reduced and squared as at 23, is supported by the arms, the said arms having a square opening for receiving the squared portion of the shaft and being provided with a set screw 24 for securing the parts together. The ends of the shaft are threaded as at 25, and each end is provided with a bearing nut 26, having a ball groove 27, and retained in position by a nut 28 also threaded on the shaft. A bushing 29 provided with ball grooves 30 at its ends is arranged between the nuts, and balls 31 are arranged within the grooves to provide a ball bearing between the bushing and the nuts. Rings 32 are arranged at each end of the bushing, and secured to the rings is a cylindrical shell or tire 33, the shell being secured to the rings by the screws 34.

The extreme ends 18 of the arms of the yoke are given a quarter turn as at 37, and are turned back upon themselves, the free ends thereof being secured to the arms as at 38, the said free ends being given a quarter turn before their junction with the main portions of the arms as shown at 38. It will be noticed that by the two quarter turns the central portion of the return part of the arm is approximately in a horizontal plane, and to this horizontal portion is secured a guard 39 by rivets 40 as shown in Fig. 4, the said guard being curved transversely to correspond with the curve of the roller, and also curved longitudinally forward as shown in Fig. 3 and downward as shown in Fig. 4.

In the ordinary use of my improvement, two poles are connected with the car, one at each end thereof, and the advance pole is tied down. If, however, it is desired to use only one pole, the pole may be mounted rotatably in any suitable manner. In Figs. 5 and 6 I have shown a rotatable mounting in which the base 41 secured to the car roof, is provided at opposite sides with cam-shaped lugs or projections 42, and with a central pin 43, on which is journaled a sleeve 44, to which the pole 15 is pivotally connected as at 45. The sleeve at its lower end is provided with oppositely arranged notches 46, for engagement by lugs 47 on the sides of the pin for locking the sleeve in adjusted position. The pole 15 is provided on its lower face with a lug 48, for coöperating with the lugs 42 whereby to lift the sleeve above the lugs 47 as shown in Fig. 6, after which the pole may be rotated so that it points in the opposite direction. When the pole is released and allowed to spring upward, the sleeve moves downward by gravity on the pin, thus engaging the lugs 47 with the notches 46.

It will be evident from the description, that the rigid mounting of the pole and the length of the roller together with the guards prevent the disengagement of the trolley from the wire, and also dispenses with the necessity of overhead switch-pans. The ball bearing shown and described may also be dispensed with except for very speedy runs. The upper surfaces of the guards 39, are flush with the periphery of the roller, so that when the roller is displaced, the guard will be beneath the wire, and as soon as the direction of length of the car is parallel with the wire, the roller will shift to a position directly beneath the wire, there being no difference in level between the upper surface of the guard and the upper surface of the roller.

By providing the guards with a forward and downward curve, either cross wires or parallel wires are engaged with equal facility to move them above the roller. Without such forward curve, cross wires would be struck with the side of the guard instead of moved smoothly upon the roller. Considerable strain is thus eliminated especially on cross wires. If the cross wire cannot give, the trolley will be moved down to pass under such cross wire.

I claim—

1. In a trolley, a yoke having arms provided with bearings and whose extremities are returned to overlie the said bearings and are secured at their ends to the arms in the rear of the bearings, a roller journaled in the bearings, and guards secured at their upper ends to the return portion of the arms above the bearings, said guards being curved transversely to correspond with the curvature of the roller, the upper faces of the guards being flush with the periphery of the roller.

2. In a trolley, a yoke having arms provided with bearings and whose extremities are returned to overlie the bearings and are secured at their ends to the arms in the rear of the bearings, a shaft in the bearings, a bushing on the shaft, rings on the ends of the bushing, and guards supported by the return portions of the arms.

3. In a trolley, a yoke having arms provided with bearings and whose extremities are returned to overlie the bearings and are secured at their ends to the arms in the rear of the bearings, a roller journaled in the bearings, and guards connected with the return portion of the arms.

EDWIN H. GREEN.

Witnesses:
RAY KIMBALL,
JOHN C. COBURN.